United States Patent
Khanal

(10) Patent No.: US 11,647,083 B2
(45) Date of Patent: May 9, 2023

(54) CLUSTER-AWARE MULTIPATH TRANSMISSION CONTROL PROTOCOL (MPTCP) SESSION LOAD BALANCING

(71) Applicant: Citrix Systems, Inc., Fort Lauderdale, FL (US)

(72) Inventor: Krishna Khanal, San Jose, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 108 days.

(21) Appl. No.: 17/380,326

(22) Filed: Jul. 20, 2021

(65) Prior Publication Data

US 2023/0027642 A1 Jan. 26, 2023

(51) Int. Cl.
*H04L 67/141* (2022.01)
*H04L 45/24* (2022.01)

(52) U.S. Cl.
CPC ............ *H04L 67/141* (2013.01); *H04L 45/24* (2013.01)

(58) Field of Classification Search
CPC .............................. H04L 67/141; H04L 45/24
See application file for complete search history.

(56) References Cited

U.S. PATENT DOCUMENTS

| | | | | |
|---|---|---|---|---|
| 10,534,681 | B2* | 1/2020 | Beck | G06F 9/4843 |
| 2019/0370325 | A1* | 12/2019 | Dasgupta | G06F 40/295 |
| 2020/0021430 | A1* | 1/2020 | Grubin | H04L 9/0643 |
| 2020/0267225 | A1* | 8/2020 | Wang | H04L 67/1023 |
| 2021/0014045 | A1* | 1/2021 | Shamai | H04L 9/0877 |

* cited by examiner

*Primary Examiner* — Michael A Keller
*Assistant Examiner* — Thao D Duong

(57) ABSTRACT

Systems and methods for establishing a multipath connection include a first processor of a first cluster forwarding a first request from a client to establish a first connection with a server to a second processor of a second cluster. A third processor of the first cluster receives a second request to establish a multipath connection between the client and the server. The third processor forwards the second request to the second processor responsive to determining that the second request is to establish a multipath connection. The second processor establishes the multipath connection that includes the first connection and a second connection used as paths of the multipath connection.

17 Claims, 11 Drawing Sheets

CLUSTER-AWARE MULTIPATH TRANSMISSION CONTROL PROTOCOL (MPTCP) SESSION LOAD BALANCING

FIELD OF THE DISCLOSURE

The present application generally relates to load balancing, including but not limited to systems and methods for cluster-aware multipath transmission control protocol (MPTCP) session load balancing.

BACKGROUND

A client may establish a session or connection with a resource. In some instances, clients may attempt to establish multiple connections with a resource. For example, a client may establish a primary and secondary connection with the resource. The primary and secondary connection may together form a multipath connection.

SUMMARY

This Summary is provided to introduce a selection of concepts in a simplified form that is further described below in the Detailed Description. This Summary is not intended to identify key features or essential features, nor is it intended to limit the scope of the claims included herewith.

In some implementations, where multipath connections (such as multipath transmission control protocol MPTCP, RFC 6824, or other multipath connections) are processed by processors of a cluster of processors, the different connections (called subflows) of the same MPTCP session may be received by different processors or nodes of the cluster. However, the connections of the same MPTCP connection should be steered and aggregated into the same node for processing the in-sequence data and pass to the applications or resource to be accessed by the client. In various implementations, to steer the subflows to a single node, some systems may use a stateful session store, synchronization, lookup, packet encapsulation (such as generic routing encapsulation tunneling), and so forth. Such systems therefore result in a significant amount of processing just for steering packets to the proper node. For instance, due to the architecture of the cluster of processors (i.e., where the processors are horizontally scaled), the subflows may use two hop steering within the cluster of processors, which means that a large portion (such as two thirds) of the packets processed within the cluster would just be the steered packets. Such systems dramatically reduce the overall goodput of the clusters. Additionally, in the event of a cluster auto scale (i.e., adding or removing processors to a cluster, resetting one or more processors of the cluster, etc.), such systems may break the MPTCP sessions. This steering issue is more severe on the public cloud cluster deployments where steered packets are also considered as part of the 'Packet Per Second' (PPS) limit, which dramatically reduces the PPS limit for actual client/server packet processing capacity of each node or processor within a cluster.

The systems and methods described herein provide for associating multiple subflows of an MPTCP session using two-tier clustering deployment architecture. For example, a first tier of processors may act as an ingress to the second tier of processors. The first tier of processors may perform TCP level load balancing. Additionally, the first tier of processors may use or leverage tokens (or other code) for connection persistency for MPTCP connections. The first tier of processors may ensure that all the subflows belonging to the same MPTCP session are load balanced to the same node or processor within the second tier of processors. Such implementations and embodiments may avoid the packet steering requirement, session store and look-up requirement and requirement to encapsulate the packets while steering between nodes described above. By eliminating packet steering requirements, session store and look-up requirements, and encapsulation requirements, the systems and methods described herein may dramatically increase the overall goodput of the processors and reduces the cost to the customer.

According various implementations of the present disclosure, the systems and methods described herein may use a token derived from a key exchanged in the establishment of a primary connection as a way to associate and aggregate all the subsequent subflow connections associated to a single MPTCP session. In some implementations, clusters of processors may be configured in a two-tier mode. The processors of first tier may be configured on standalone, active-passive high availability or active-active clustering mode based on the scaling, availability and resiliency requirements for the customer. The processors of the first tier may load balance the primary subflow to one of the selected processors in the cluster of processors of the second tier (for example, using a load balancing algorithm, such as a least connection algorithm or a weighted round robin algorithm). The processors of the first tier may store key value information for the primary connection (such as a token or other identifier an information relating to the selected processor of the second tier) in a data structure (such as a distributed hash table). In some instances, the data structure may be accessible to all processors within the first tier. When a processor of the first cluster receive a secondary connection with a token (i.e., a token which matches a token in the data structure corresponding to a primary connection), the processor may perform a lookup in the data structure using the token to find or identify the processor of the second tier. The processor of the first tier may then route the second request for the secondary connection to processor of the second tier such that the secondary connections are load balanced to the same node in the second tier ADC which has the primary connection. On the selected processor of the second cluster, all the connections belonging to the same multipath connection are received on the same node or processor, thereby avoiding the steering requirement within the processors of the second cluster.

In one or more embodiments, where a processor of the first cluster receives a request to establish a first (i.e., a primary) connection from a client to a server, the processor may select a processor of the second cluster to load balance the processors of the second cluster. The processor of the first cluster may select the processor of the second cluster and the processor of the second cluster may respond with an acknowledgement (i.e., a synchronization acknowledgement SYN-ACK) along with a key for the processor of the second cluster. The processor of the first cluster may receive a third acknowledgement of a three-way handshake (i.e., a TCP 3-way handshake between the client, the processor of the first cluster, and the processor of the second cluster). Upon receiving the third acknowledgement, the processor of the first cluster may derive a token for the primary connection using the key in the third acknowledgement. The processor of the first cluster may store the token in a data structure (such as a distributed hash table) along with information relating to the processor of the second cluster. In some implementations, the data structure may be distributed or otherwise accessible by other processors of the first engine, thereby providing persistency of the connection regardless of processor removal or addition events for the first cluster. The processor of the first cluster may forward the third acknowledgment to the selected processor of the second cluster. The processor of the first cluster may also allocate local load balancing session to forward subsequent packets on the primary connection to the selected processor of the second cluster. The processor of the second cluster may create a session or connection (such as a TCP socket session) for the primary connection between the client and the server.

When a processor of the first cluster receives a second request to establish a second connection (i.e., a secondary connection for a multipath connection), the processor of the first cluster may perform a lookup in the data structure using a token received with the second request to identify the selected processor of the second cluster. If the lookup returns data relating to the selected processor of the second cluster, the processor of the first cluster may forward the second request to the selected processor of the second cluster such that the secondary connection is load balanced to the same selected processor of the second cluster. If the lookup does not return data relating to a processor of the second cluster, the secondary connections for the token may be reset within the data structure (i.e., by sending a reset signal to the data structure). Upon receiving a connection closure signal from the client, the first processor may remove an entry corresponding to the token from the data structure.

According to one or more embodiments of the present solution, a first processor of a first cluster of processors that is intermediary to a client and a second cluster of processors and the second cluster of processors is intermediary to the first cluster of processors and a server, may forward, to a second processor of the second cluster, a first request from the client to establish a first connection with the server. A third processor of the first cluster of processors may receive a second request from the client to establish a multipath connection between the client and the server. The third processor may forward, responsive to determining that the second request is to establish a multipath connection, the second request to the second processor to establish the multipath connection that includes the first connection and a second connection used as paths of the multipath connection.

According to one or more embodiments of the present solution, a first processor intermediary to a server and a cluster of processors may receive, from a second processor of the cluster of processors that is intermediary to the first processor and a client, a first request to establish a first connection between the client and a server. The first processor may receive from a third processor of the cluster of processors, a second request to establish a second connection between the client and the server. The first processor may establish, between the client and the server, a multipath connection that includes the first connection and the second connection used as paths of the multipath connection.

The systems and methods of the present solution may increase or improve the overall goodput of the clusters by eliminating redundancies in identifying processors which are to receive multipath connections as well as routing of such packets. Additionally, the systems and methods of the present solution may increase persistency of multipath connections in the event of a cluster auto scale by maintaining tokens for the primary and secondary connections in a data structure. The systems and methods described herein may reduce the impact in PPS limits by reducing traffic between processors relating to routing or steering of connections, which may improve actual client/server packet processing capacity of each node or processor within a cluster. The systems and methods described herein may be used for multipath TCP connections, as well as other types of connections (such as QUIC protocol) which use connection identifiers (similar to tokens) for multipath support.

In one aspect, this disclosure is directed to a method. The method includes forwarding, by a first processor of a first cluster of processors that is intermediary to a client and a second cluster of processors and the second cluster of processors is intermediary to the first cluster of processors and a server, to a second processor of the second cluster, a first request from the client to establish a first connection with the server. The method includes receiving, by a third processor of the first cluster of processors, from the client, a second request to establish a multipath connection between the client and the server. The method includes forwarding, by the third processor, responsive to determining that the second request is to establish a multipath connection, the second request to the second processor to establish the multipath connection that includes the first connection and a second connection used as paths of the multipath connection.

In some embodiments, the method further includes receiving, by the first processor from the second processor, a response to the first request including a key. The method may further include generating, by the first processor, a token based on the key from the response to the first request. The method may further include storing, by the first processor, the token in a data structure maintained by the first processor accessible by the first cluster of processors. In some embodiments, the third processor determines that the second request is to establish a multipath connection responsive to the second request including the token. In some embodiments, the token is a first token, the second request includes a second token. The method may further include identifying, by the third processor, the second processor to which the third processor is to forward the second request based on the second token matching the first token from the data structure. In some embodiments, the data structure comprises a table including a plurality of tokens for a plurality of connections between clients and processors of the second cluster. In some embodiments, the token is a first token, the client generates a second token which matches the first token using the key received from the response, the second request includes the second token, and the method further includes querying, by the third processor, the table maintained by the first processor using the second token to identify the second processor. In some embodiments, the data structure comprises a first data structure, and the method further includes transmitting, by the first processor to the third processor of the first cluster, the token for storage in a second data structure maintained by the third processor. In some embodiments, the method further includes receiving, by the first processor, the first request from a client, and selecting, by the first processor, the second processor from the cluster of second processors to which to forward the first request based on a load of the second processor.

In another aspect, this disclosure is directed to a method. The method includes receiving, by a first processor intermediary to a server and a cluster of processors, from a second processor of the cluster of processors that is intermediary to the first processor and a client, a first request to establish a first connection between the client and a server. The method includes receiving, by the first processor, from a third processor of the cluster of processors, a second request to establish a second connection between the client and the server. The method includes establishing, by the first processor, between the client and the server, a multipath connection that includes the first connection and the second connection used as paths of the multipath connection.

In some embodiments, the method includes providing, by the first processor to the second processor, a response to the first request including a key, the key used to generate a token by the second processor to be shared across the processors of the cluster. In some embodiments, the second request includes a token generated by the client based on a key included in a response to the first request, and the first processor establishes the multipath connection responsive to the token included in the second request. In some embodiments, the third processor identifies a token from the second request received from the client, the token generated using a key provided by the first processor to the second processor responsive to the first request, the third processor forwarding the second request to the first processor responsive to determining.

In another aspect, this disclosure is directed to a device. The device includes a first processor of a first cluster of processors that is intermediary to a client and a second cluster of processors and the second cluster of processors is intermediary to the first cluster of processors and a server. The first processor is configured to transmit, to a second processor of the second cluster, a first request from the client to establish a first connection with the server. The first processor is configured to receive, from the client, a second request to establish a multipath connection between the client and the server. The first processor is configured to forward, responsive to determining that the second request is to establish a multipath connection, the second request to the second processor to establish the multipath connection that includes the first connection and a second connection used as paths of the multipath connection.

In some embodiments, the first processor is further configured to receive, from the second processor, a response to the first request including a key generate a token based on the key from the response to the first request, and store the token in a data structure maintained by the first processor accessible by the first cluster of processors. In some embodiments, the first processor determines that the second request is to establish a multipath connection responsive to the second request including the token. In some embodiments, the token is a first token, the second request includes a second token, and the first processor is further configured to identify the second processor to which the first processor is to forward the second request based on the second token matching the first token from the data structure. In some embodiments, the data structure comprises a table including a plurality of tokens for a plurality of connections between clients and processors of the second cluster. In some embodiments, the token is a first token, the client generates a second token which matches the first token using the key received from the response, the second request includes the second token, and the first processor is further configured to query the table maintained by the first processor using the second token to identify the second processor. In some embodiments, the data structure comprises a first data structure, and the first processor is further configured to transmit, to a third processor of the first cluster, the token for storage in a second data structure maintained by the third processor. In some embodiments, the first processor is further configured to receive the first request from a client, and select the second processor from the cluster of second processors to which to forward the first request based on a load of the second processor.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, with emphasis instead being placed upon illustrating embodiments, principles, and concepts. The drawings are not intended to limit the scope of the claims included herewith.

DETAILED DESCRIPTION

Figure 1A:
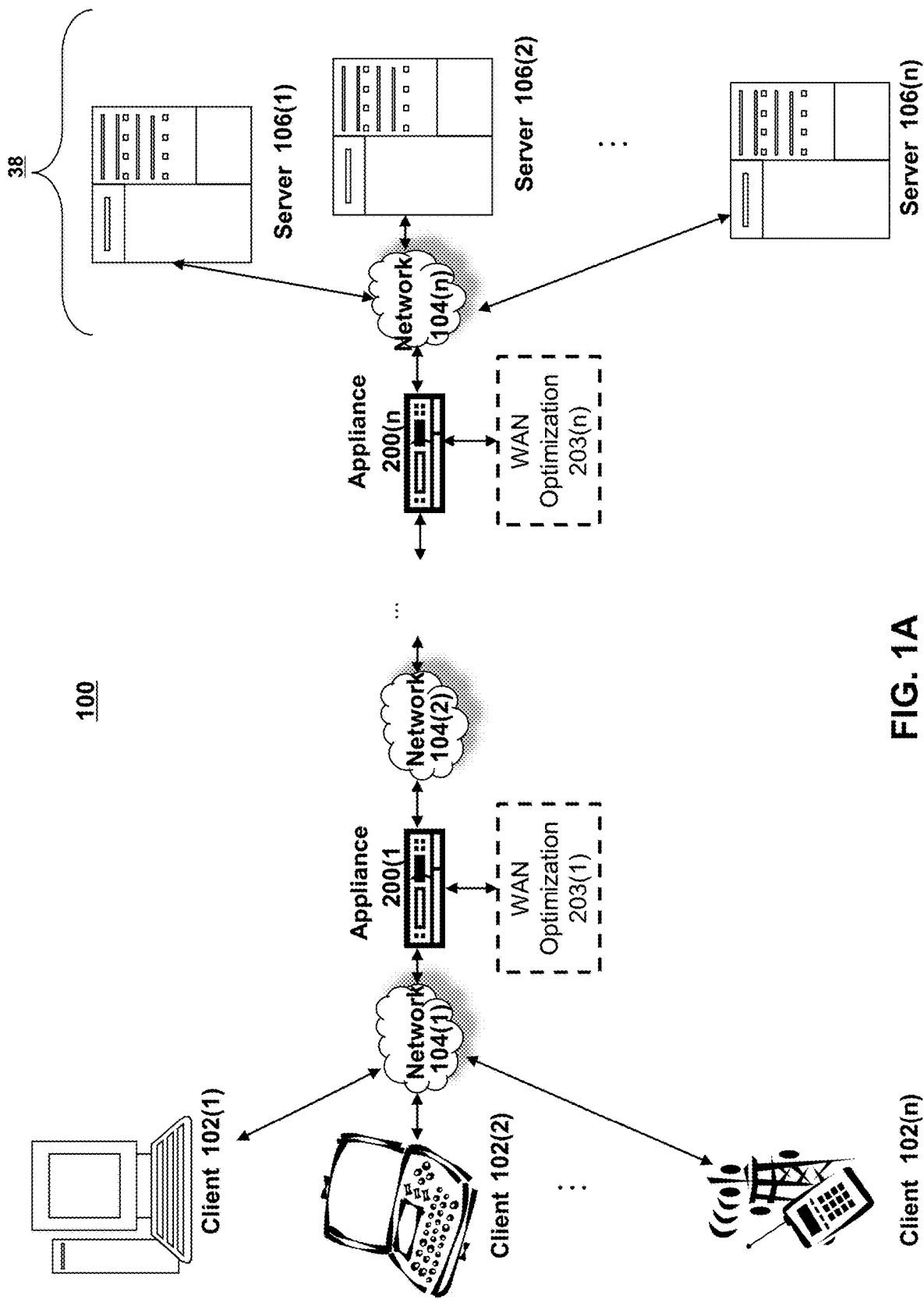
FIG. 1A is a block diagram of a network computing system, in accordance with an illustrative embodiment.

In some implementations, where multipath connections (such as multipath transmission control protocol MPTCP, RFC 6824, or other multipath connections) are processed by processors of a cluster of processors, the different connections (called subflows) of the same MPTCP session may be received by different processors or nodes of the cluster. However, the connections of the same MPTCP connection should be steered and aggregated into the same node for processing the in-sequence data and pass to the applications or resource to be accessed by the client. In various implementations, to steer the subflows to a single node, some systems may use a stateful session store, synchronization, lookup, packet encapsulation (such as generic routing encapsulation tunneling), and so forth. Such systems therefore result in a significant amount of processing just for steering packets to the proper node. For instance, due to the architecture of the cluster of processors (i.e., where the processors are horizontally scaled), the subflows may use two hop steering within the cluster of processors, which means that a large portion (such as two thirds) of the packets processed within the cluster would just be the steered packets. Such systems dramatically reduce the overall goodput of the clusters. Additionally, in the event of a cluster auto scale (i.e., adding or removing processors to a cluster, resetting one or more processors of the cluster, etc.), such systems may break the MPTCP sessions. This steering issue is more severe on the public cloud cluster deployments where steered packets are also considered as part of the 'Packet Per Second' (PPS) limit, which dramatically reduces the PPS limit for actual client/server packet processing capacity of each node or processor within a cluster.

The systems and methods described herein provide for associating multiple subflows of an MPTCP session using two-tier clustering deployment architecture. For example, a first tier of processors may act as an ingress to the second tier of processors. The first tier of processors may perform TCP level load balancing. Additionally, the first tier of processors may use or leverage tokens (or other code) for connection persistency for MPTCP connections. The first tier of processors may ensure that all the subflows belonging to the same MPTCP session are load balanced to the same node or processor within the second tier of processors. Such implementations and embodiments may avoid the packet steering requirement, session store and look-up requirement and requirement to encapsulate the packets while steering between nodes described above. By eliminating packet steering requirements, session store and look-up requirements, and encapsulation requirements, the systems and methods described herein may dramatically increase the overall goodput of the processors and reduces the cost to the customer.

According various implementations of the present disclosure, the systems and methods described herein may use a token derived from a key exchanged in the establishment of a primary connection as a way to associate and aggregate all the subsequent subflow connections associated to a single MPTCP session. In some implementations, clusters of processors may be configured in a two-tier mode. The processors of first tier may be configured on standalone, active-passive high availability or active-active clustering mode based on the scaling, availability and resiliency requirements for the customer. The processors of the first tier may load balance the primary subflow to one of the selected processors in the cluster of processors of the second tier (for example, using a load balancing algorithm, such as a least connection algorithm or a weighted round robin algorithm). The processors of the first tier may store key value information for the primary connection (such as a token or other identifier an information relating to the selected processor of the second tier) in a data structure (such as a distributed hash table). In some instances, the data structure may be accessible to all processors within the first tier. When a processor of the first cluster receive a secondary connection with a token (i.e., a token which matches a token in the data structure corresponding to a primary connection), the processor may perform a lookup in the data structure using the token to find or identify the processor of the second tier. The processor of the first tier may then route the second request for the secondary connection to processor of the second tier such that the secondary connections are load balanced to the same node in the second tier ADC which has the primary connection. On the selected processor of the second cluster, all the connections belonging to the same multipath connection are received on the same node or processor, thereby avoiding the steering requirement within the processors of the second cluster.

In one or more embodiments, where a processor of the first cluster receives a request to establish a first (i.e., a primary) connection from a client to a server, the processor may select a processor of the second cluster to load balance the processors of the second cluster. The processor of the first cluster may select the processor of the second cluster and the processor of the second cluster may respond with an acknowledgement (i.e., a synchronization acknowledgement SYN-ACK) along with a key for the processor of the second cluster. The processor of the first cluster may receive a third acknowledgement of a three-way handshake (i.e., a TCP 3-way handshake between the client, the processor of the first cluster, and the processor of the second cluster). Upon receiving the third acknowledgement, the processor of the first cluster may derive a token for the primary connection using the key in the third acknowledgement. The processor of the first cluster may store the token in a data structure (such as a distributed hash table) along with information relating to the processor of the second cluster. In some implementations, the data structure may be distributed or otherwise accessible by other processors of the first engine, thereby providing persistency of the connection regardless of processor removal or addition events for the first cluster. The processor of the first cluster may forward the third acknowledgment to the selected processor of the second cluster. The processor of the first cluster may also allocate local load balancing session to forward subsequent packets on the primary connection to the selected processor of the second cluster. The processor of the second cluster may create a session or connection (such as a TCP socket session) for the primary connection between the client and the server.

When a processor of the first cluster receives a second request to establish a second connection (i.e., a secondary connection for a multipath connection), the processor of the first cluster may perform a lookup in the data structure using a token received with the second request to identify the selected processor of the second cluster. If the lookup returns data relating to the selected processor of the second cluster, the processor of the first cluster may forward the second request to the selected processor of the second cluster such that the secondary connection is load balanced to the same selected processor of the second cluster. If the lookup does not return data relating to a processor of the second cluster, the secondary connections for the token may be reset within the data structure (i.e., by sending a reset signal to the data structure). Upon receiving a connection closure signal from the client, the first processor may remove an entry corresponding to the token from the data structure.

According to one or more embodiments of the present solution, a first processor of a first cluster of processors that is intermediary to a client and a second cluster of processors and the second cluster of processors is intermediary to the first cluster of processors and a server, may forward, to a second processor of the second cluster, a first request from the client to establish a first connection with the server. A third processor of the first cluster of processors may receive a second request from the client to establish a multipath connection between the client and the server. The third processor may forward, responsive to determining that the second request is to establish a multipath connection, the second request to the second processor to establish the multipath connection that includes the first connection and a second connection used as paths of the multipath connection.

According to one or more embodiments of the present solution, a first processor intermediary to a server and a cluster of processors may receive, from a second processor of the cluster of processors that is intermediary to the first processor and a client, a first request to establish a first connection between the client and a server. The first processor may receive from a third processor of the cluster of processors, a second request to establish a second connection between the client and the server. The first processor may establish, between the client and the server, a multipath connection that includes the first connection and the second connection used as paths of the multipath connection.

The systems and methods of the present solution may increase or improve the overall goodput of the clusters by eliminating redundancies in identifying processors which are to receive multipath connections as well as routing of such packets. Additionally, the systems and methods of the present solution may increase persistency of multipath connections in the event of a cluster auto scale by maintaining tokens for the primary and secondary connections in a data structure. The systems and methods described herein may reduce the impact in PPS limits by reducing traffic between processors relating to routing or steering of connections, which may improve actual client/server packet processing capacity of each node or processor within a cluster. The systems and methods described herein may be used for multipath TCP connections, as well as other types of connections (such as QUIC protocol) which use connection identifiers (similar to tokens) for multipath support.

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for providing a clustered appliance architecture environment;

Section D describes embodiments of systems and methods for providing a clustered appliance architecture environment; and Section E describes embodiments of systems and methods for cluster-aware multipath transmission control protocol (MPTCP) session load balancing.

A. Network and Computing Environment

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as Citrix networking (formerly NetScaler®) products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Citrix SD-WAN products sold by Citrix Systems, Inc. of Fort Lauderdale, Fla.

Figure 1B:
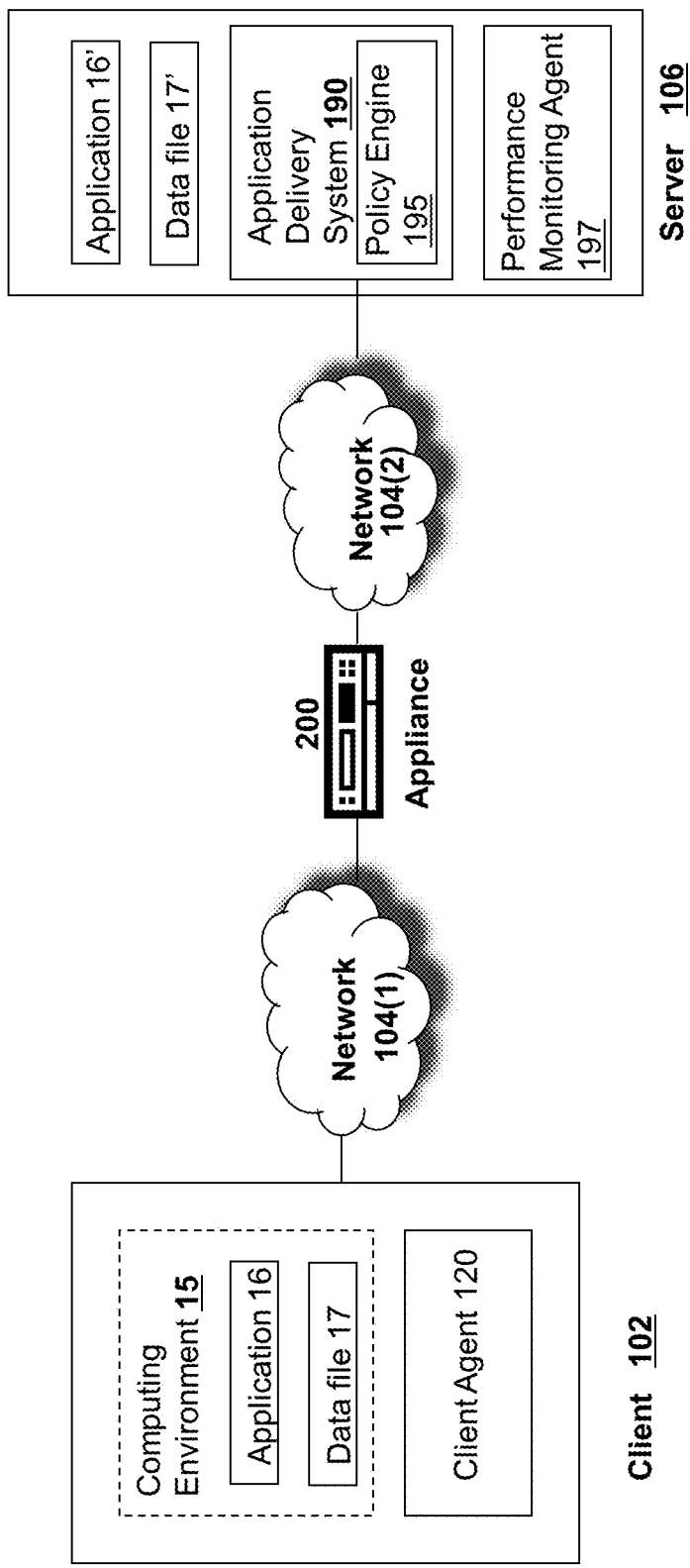
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as Citrix Virtual Apps and Desktops (formerly XenApp® and XenDesktop®).

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), desktop as a service (DaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliance 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as Citrix Analytics or Citrix Application Delivery Management by Citrix Systems, Inc. of Fort Lauderdale, Fla.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
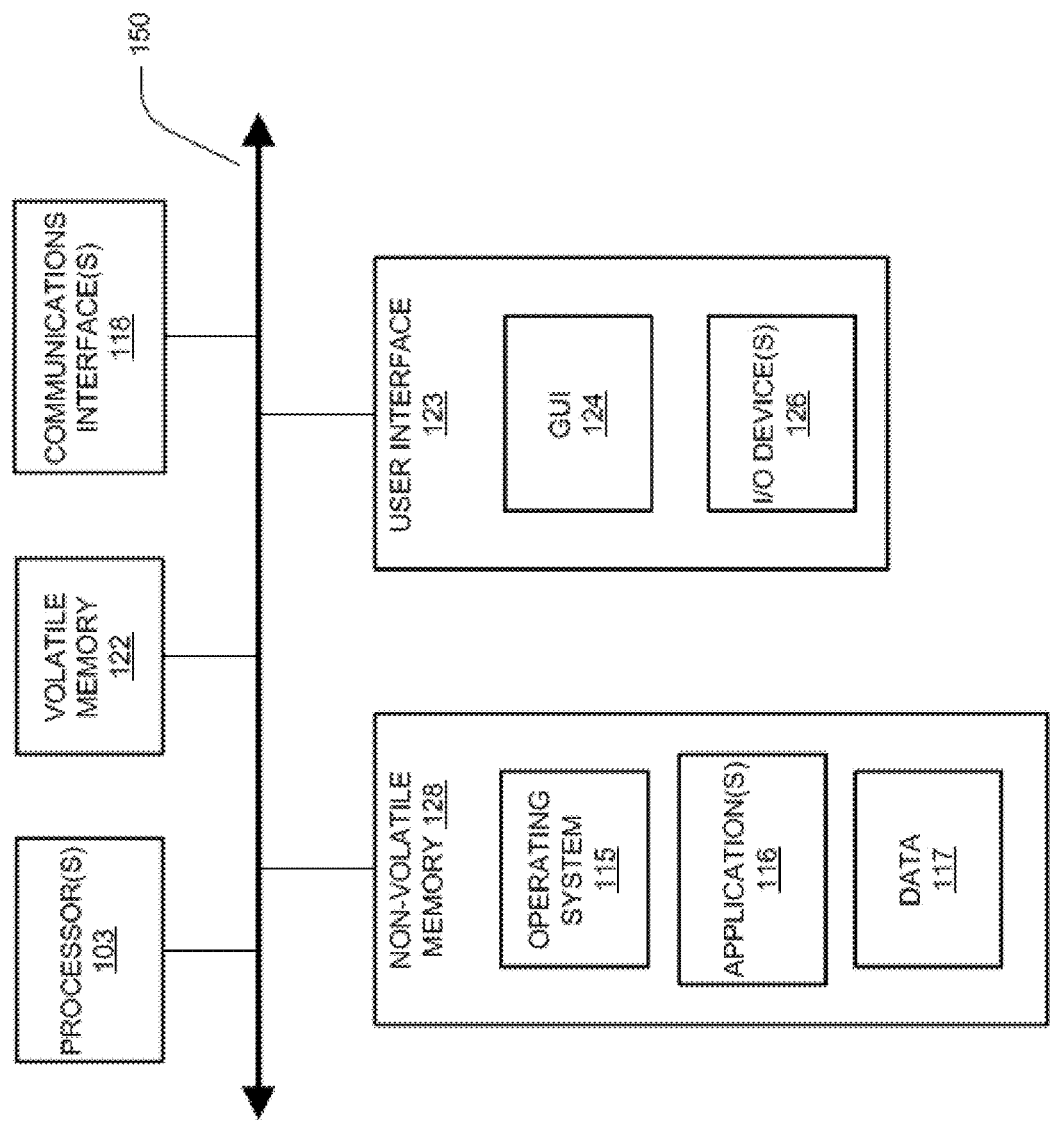
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

B. Appliance Architecture

Figure 2:
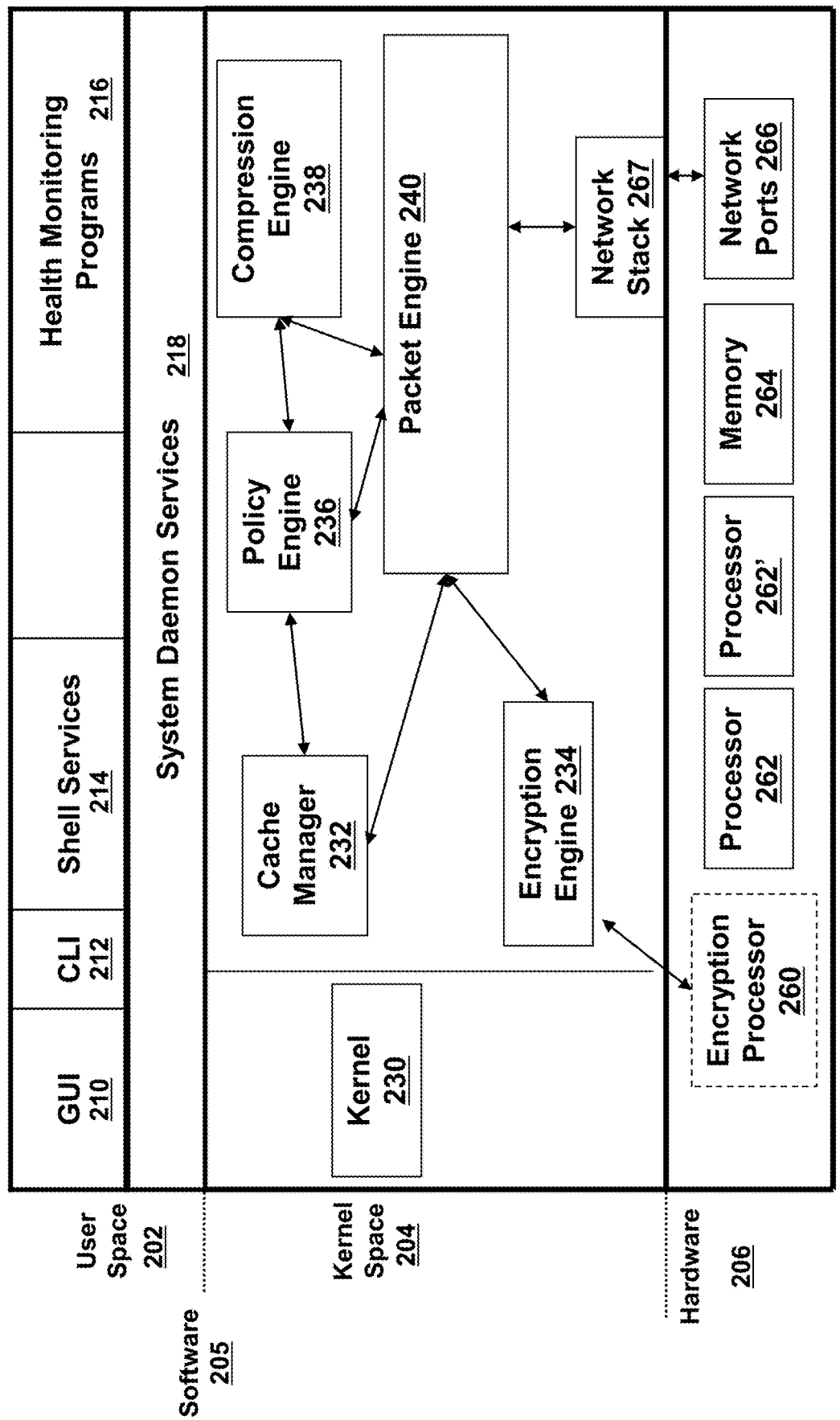
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

C. Systems and Methods for Virtualizing an Application Delivery Controller

Figure 3:
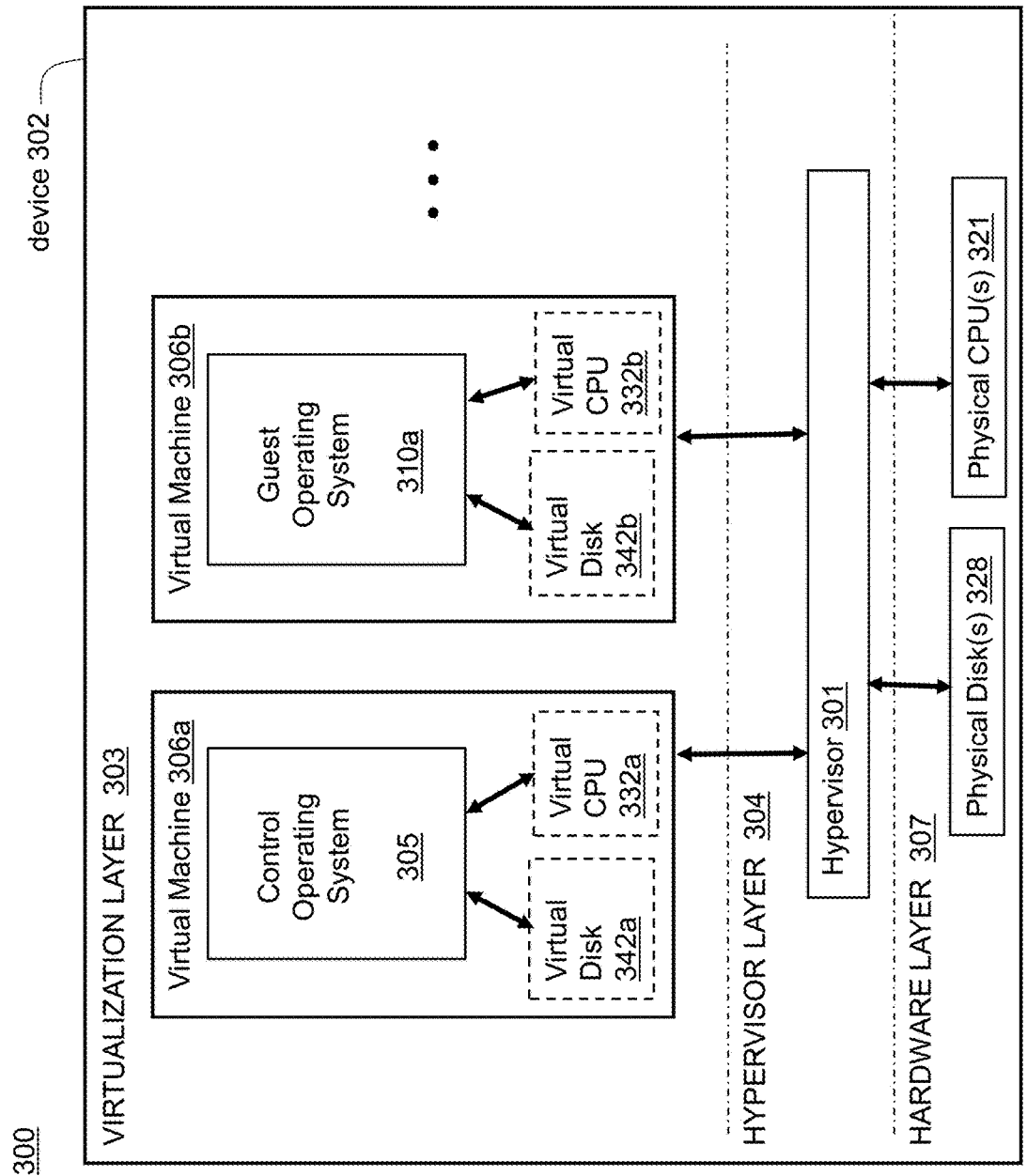
FIG. 3 is a block diagram of a virtualization environment, in accordance with an illustrative embodiment.

Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a Citrix Hypervisor by Citrix Systems, Inc. of Fort Lauderdale, Fla. In an illustrative embodiment, device 302 executing a hypervisor that creates a virtual machine platform on which guest operating systems may execute is referred to as a host server. 302

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

D. Systems and Methods for Providing a Distributed Cluster Architecture

Figure 4:
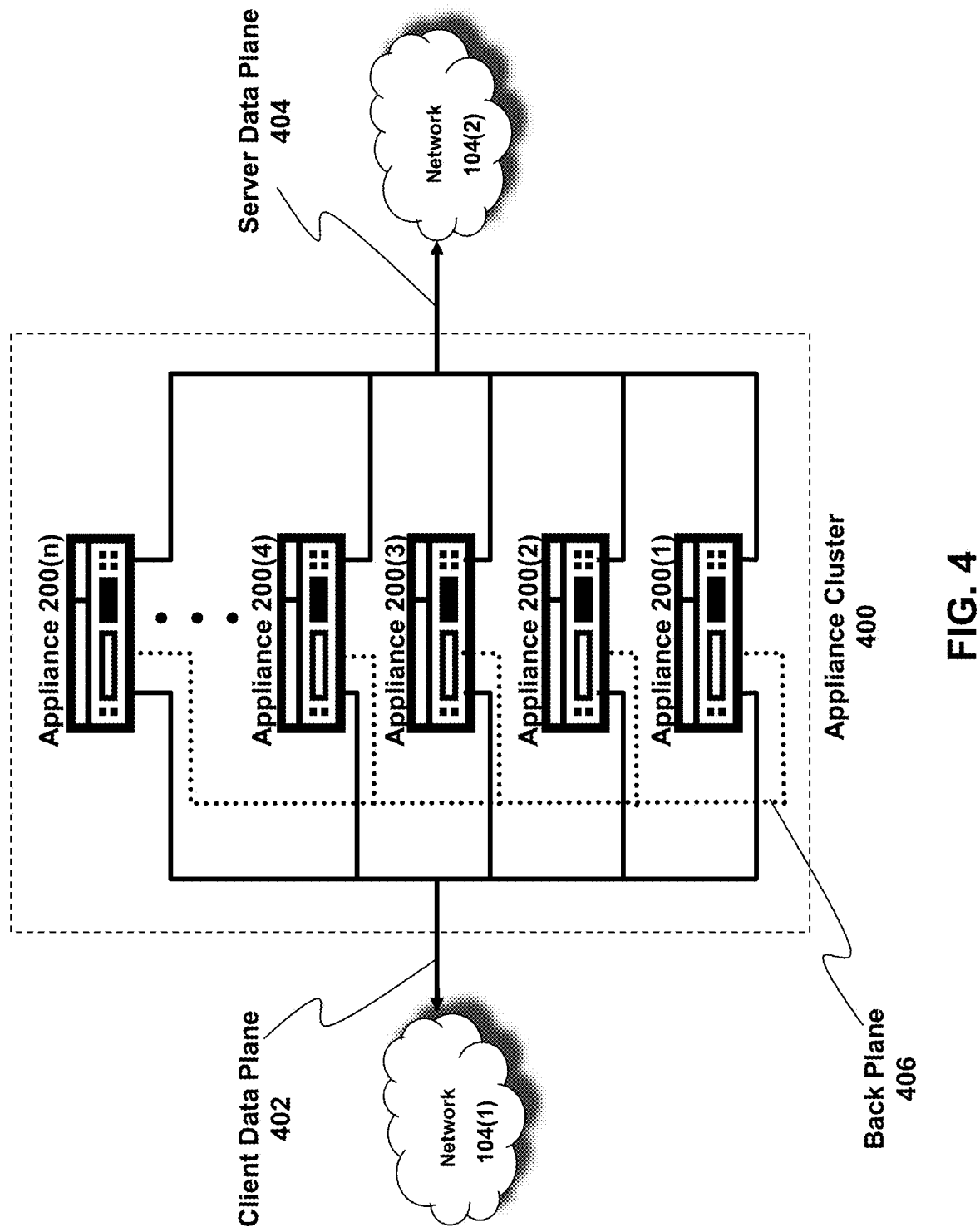
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a first network 104(1) via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multipath (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104(2) via server data plane 404. Similarly to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or back plane 406. Back plane 406 may enable inter-node or inter-appliance control and configuration messages, for inter-node forwarding of traffic, and/or for communicating configuration and control traffic from an administrator or user to cluster 400. In some embodiments, back plane 406 may be a physical network, a VPN or tunnel, or a combination thereof.

Figure 5:
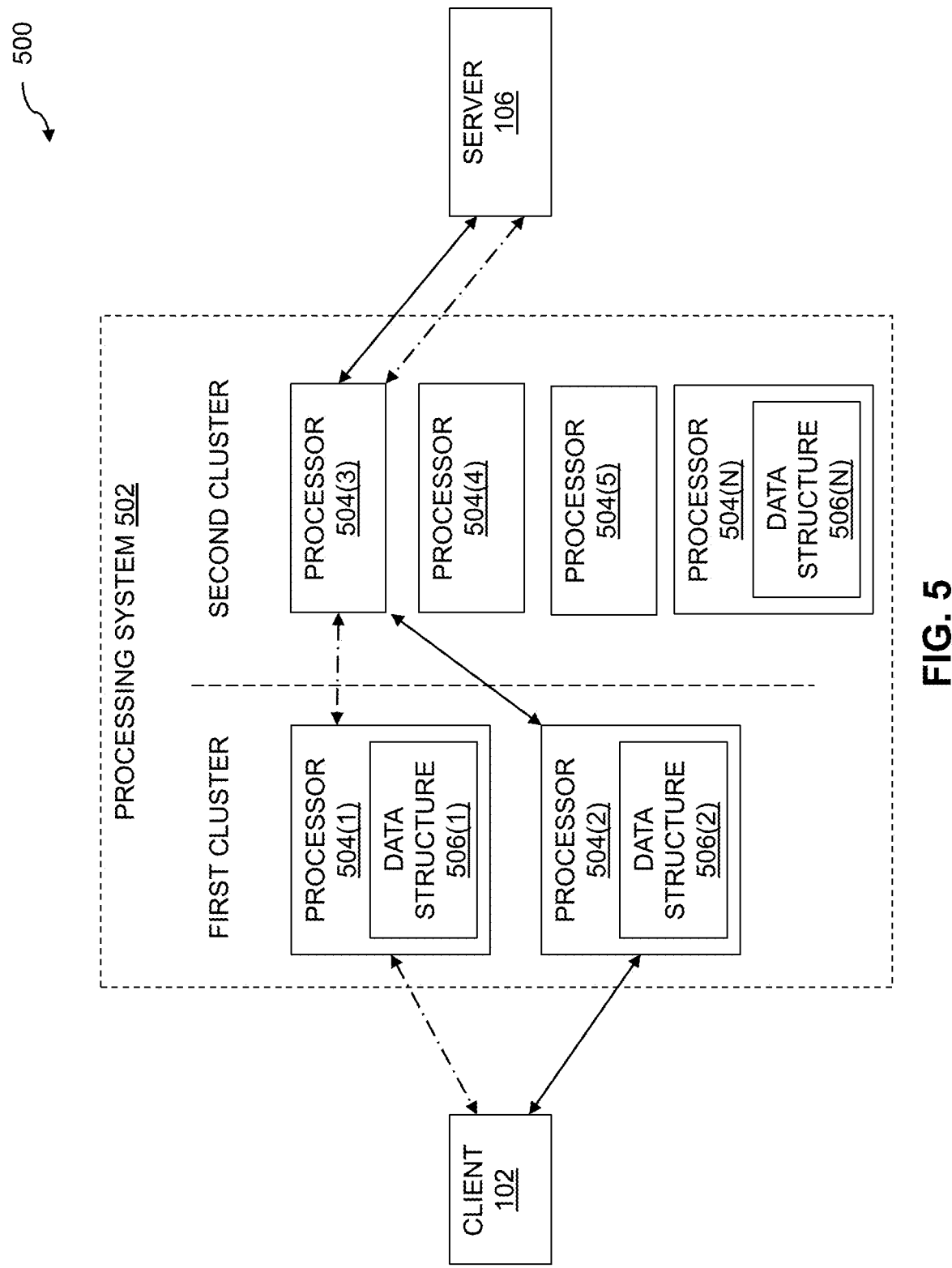
FIG. 5 is a block diagram of a system for cluster-aware multipath transmission control protocol (MPTCP) session load balancing, in accordance with an illustrative embodiment.

E. Systems and Methods for Cluster-Aware Multipath Transmission Control Protocol (MPTCP) Session Load Balancing Referring now to FIG. 5, depicted is a system 500 for cluster-aware multipath transmission control protocol (MPTCP) session load balancing, according to one or more embodiments. The system 500 is shown to include a processing system 502 intermediary to a client 102 and a server 106. The processing system 502 may include various clusters of processors 504. For example, the processing system 502 may include a first cluster of processors 504(1), 504(2) (also referred to herein as a first cluster or a first tier) intermediary to the client 102 and server 106, and a second cluster of processors 504(3)-504(N) (also referred to herein as a second cluster or a second tier) intermediary to the first cluster and the server 106. As described in greater detail below, a processor of the first cluster may receive a first request from the client 102 to establish a first connection between the client 102 and the server 106. The processor of the first cluster may select a processor of the second cluster to forward the first request. The processor of the first cluster may forward the first request to the selected processor of the second cluster. The selected processor of the second cluster may receive the request and establish the first connection between the client 102 and the server 106. Another processor of the first cluster may receive a second request to establish a multipath connection between the client 102 and the server 106. The processor of the first cluster may identify the selected processor of the second cluster to which to forward the second request responsive to determining that the second request is to establish a multipath connection. The processor may forward the second request to the selected processor. The selected processor may receive the second request, and establish a multipath connection that includes the first connection and the second connection used as paths of the multipath connection.

The systems and methods of the present solution may be implemented in any type or form of device, including clients, servers or appliances described above with reference to FIG. 1A-FIG. 4. For instance, and as described in greater detail below, the processors 504(1)-504(N) may be incorporated or otherwise implemented as processing engines in an appliance similar to the appliances 200 described above with reference to FIG. 2-FIG. 4. The clients 102 may be similar in some respects to the clients 102 described above with respect to FIG. 1A-FIG. 1B. The clients 102 may request access to a domain (e.g., a website, application, service, etc.) corresponding to a server 106, which may be similar in some respects to the server 106 described above with respect to FIG. 1A-FIG. 1B. In some implementations, the clients 102, servers 106, and/or processors 504 may include or incorporate components and devices similar in some aspects to those described above with reference to FIG. 1C, such as a memory and/or one or more processors operatively coupled to the memory. The present systems and methods may be implemented in any embodiments or aspects of the appliances or devices described herein.

The clients 102 may be the same as or similar to the clients 102 described above with respect to FIG. 1A-FIG. 1B. The clients 102 may be personal computers, laptops, desktops, tablets, mobile devices, etc. The clients 102 may be configured to access services, websites, webpages, applications, etc. corresponding to a domain hosted on various servers 106. The clients 102 may be configured to access the domain by generating requests for a processor 504 or processing engine of the processing system 502. The clients 102 may be configured to generate the requests when a user selects a service, launches a service, provides a uniform resource locator (URL) address to a browser, etc. The request may include, for instance, the URL address for the domain, a domain name, etc. The clients 102 may be configured to transmit, send, or otherwise provide the requests to a processor 504 of the first cluster for establishing a connection with the server 106. In some embodiments, the clients 102 may be configured to generate additional requests for establishing secondary connections with the server 106. For example, the clients 102 may be configured to generate requests to establish a multipath connection between the client 102 and server 106. The multipath connection may include at least a primary and secondary connection between the client 102 and server 106. The clients 102 may be configured to generate request to establish a multipath connection to, for example, increase persistency of connections (i.e., by providing multiple connections to use as a fallback in the event of one connection having an interruption), to aggregate bandwidth of different networks (i.e., aggregate bandwidth of the primary and secondary connections), to expedite delivery of content from the server 106 to the client 102 by using each of the connections, to ensure that client 102 data is secure by sending data via a more secure connection from the primary and secondary connections, and so forth. As described in greater detail below, the processors 504 of the processing system 502 may be configured to select a processor 504 of the second cluster which is to receive the connection requests from the client 102 (i.e., according to one or more load balancing algorithms), and forward each of the connection requests originating from the client 102 as part of the same session to the same processor 504.

Figure 6:
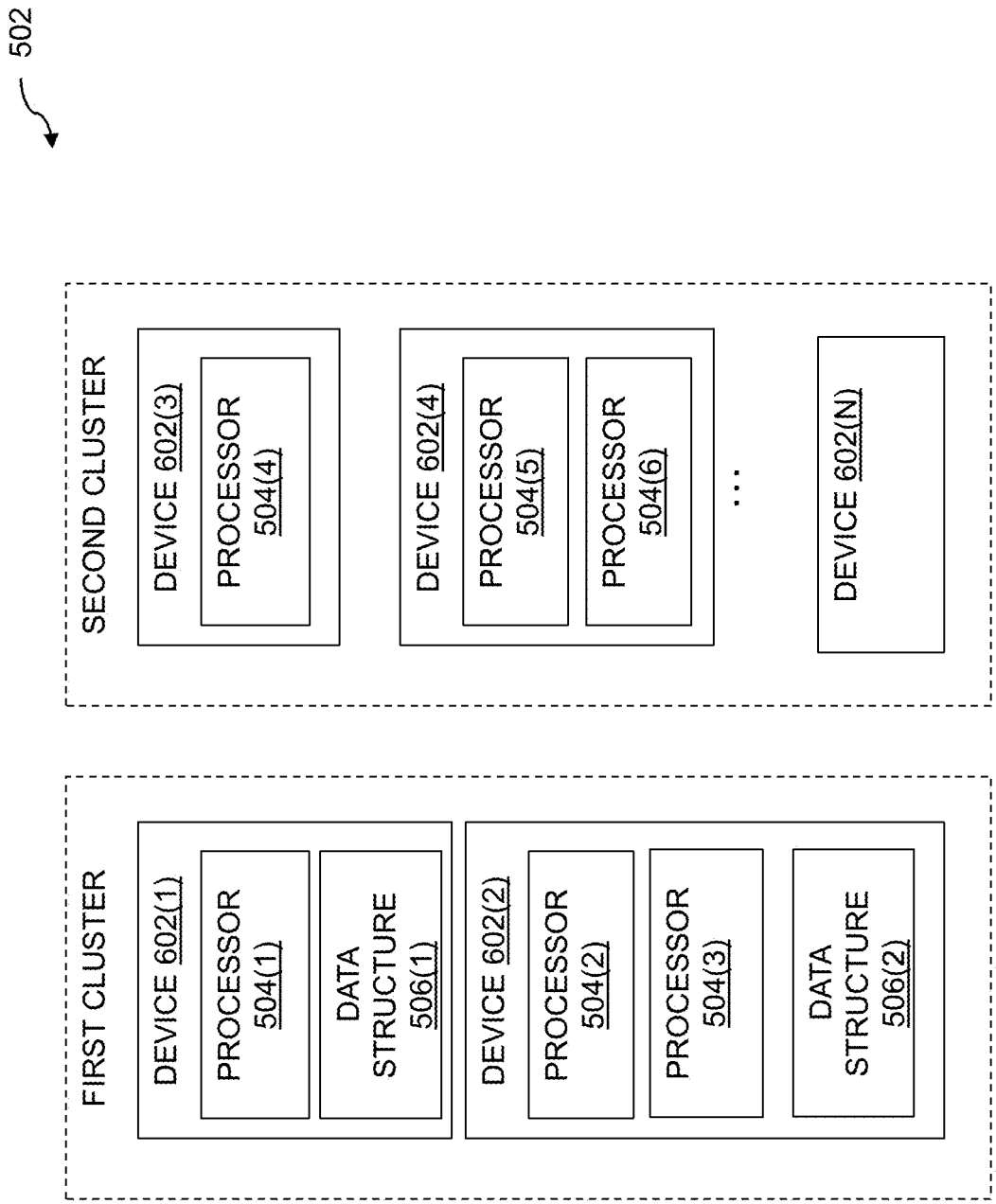
FIG. 6 is a block diagram of a processing system which may be included in the system of FIG. 5, in accordance with an illustrative embodiment.

Referring now to FIG. 5 and FIG. 6, the system 500 is shown to include a processing system 502 including a plurality of processors 504. Specifically, FIG. 6 shows the processing system 502, according to an illustrative embodiment. The processing system 502 may include a first cluster of processors 504 forming a first tier of the processing system 502, and a second cluster of processors 504 forming a second tier of the processing system 502. In some embodiments, processors 504 of the processing system 502 may be assigned to a respective cluster. For example, an administrator or other user may provide each of the processors 504 with a configuration file which assigns the processors 504 to a particular cluster (i.e., at initialization, at installation, at enrollment, etc.). The first cluster of processors 504 may receive each of the requests received from clients 102. As such, the first cluster of processors 504 may be assigned a first (or front-end) network location (i.e., a location along a network path between the client 102 and the server 106) in the configuration file. The first cluster of processors 504 may be communicably coupled to the second cluster of processors 504 such that processors 504 of the first cluster may exchange data with processors 504 of the second cluster. As described in greater detail below, the processors 504 of the first cluster may select a processor 504 of the second cluster to which to forward requests from the client to establish connections with the server 106. The second cluster of processors 504 may be configured to establish connections between the clients 102 and the server 106 based on requests received from the clients 102 via the processors 504 of the first cluster. As such, the second cluster of processors 504 may be assigned a second (or back-end) network location in the configuration file.

The first tier of the processing system 502 may be intermediary to the client 102 and the second tier of the processing system 502, and the second tier of the processing system 502 may be intermediary to the first tier of the processing system 502 and the server 106. In some embodiments, the processors 504 may be incorporated or embodied on an appliance or device 602 (such as an appliance 200 described above with reference to FIG. 2 and FIG. 4). In some embodiment, the processors 504 may each be incorporated in or embodied on a separate device 602. For example, and as shown in FIG. 6, some devices 602(1), 602(3) may include a single processor 504. In some embodiments, an appliance or device 602 may include multiple processors 504. For instance, an appliance or device 602 may be or include a multi-core processing system which includes multiple processors 502. As shown in FIG. 6, devices 602(2), 602(4) may each include multiple processors 504(2), 504(3), 504(5), 505(6).

The devices 602 are shown to include a data structure 506. The data structure 506 may include, for example, memory. The memory may include volatile memory (e.g., RAM), non-volatile memory (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), or other data structure. In some embodiments, the data structure 506 may be shared, distributed, or otherwise accessible across processors 504. For example, and in some embodiments, the data structure 506 may include a distributed hash table. The distributed hash table may be accessible by each of the processors 504 within a cluster of processors 504. For example, and in some embodiments, the distributed hash table may be accessible by the processors 504(1)-504(3) of the first cluster shown in FIG. 6. As described in greater detail below, the processors 504(1)-504(3) may be configured to store data in the distributed hash table (or other data structure) relating to connections between clients 102 and the server 106 established by processors 504 of the second cluster. Such data may be used by the processors 504(1)-504(3) to forward requests for multipath connections from a client 102 to the same processor 504 of the second cluster which established the primary connection for the client 102, as described in greater detail below.

Figure 7A:
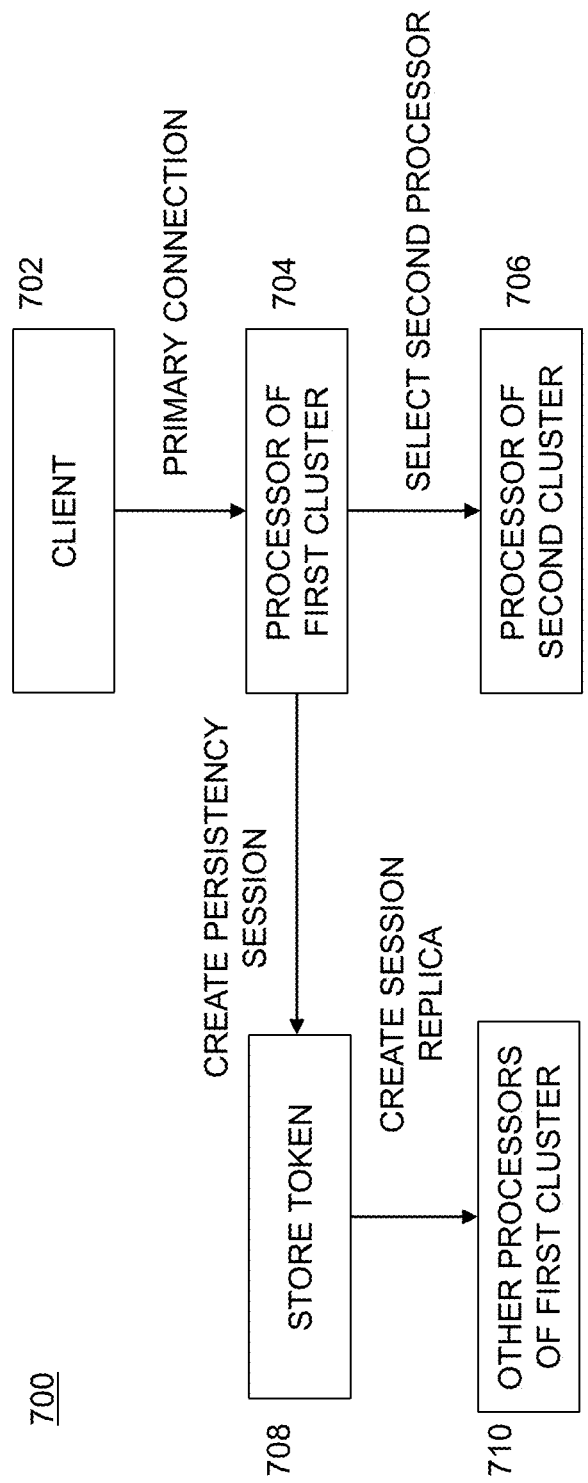
FIG. 7A is a flow diagram showing an example method of establishing a primary connection, in accordance with an illustrative embodiment.

Referring now to FIG. 7A together with FIG. 5-FIG. 6, depicted is a flow diagram showing an example method 700 of establishing a primary connection, according to an illustrative embodiment. As a brief overview, at step 702, a client 102 may be configured to generate a request for a connection. At step 704, a processor 504 of the first cluster may be configured to receive the request for the connection from the client 102 and select a processor of the second cluster. At step 706, the processor 504 of the first cluster may be configured to forward the request to the selected processor of the second cluster. At step 708, the processor 504 of the first cluster may be configured to create a persistency session and store a token in the data structure 506. At step 710, the processor 504 of the first cluster may be configured to create a session replica and forward the token to other processors of the first cluster.

At step 702, a client 102 may be configured to generate a request for a connection. The request may be a request to establish the connection between the client 102 and a server 106. In some instances, the request may be a request to establish a primary connection (or primary subflow) of a multipath connection between the client 102 and the server 106. In some embodiments, the client 102 may be configured to generate the request responsive to a user launching an application hosted on the server 106, a user providing an address (such as a uniform resource locator (URL)) for a resource (such as a webpage, document, or other data) hosted on the server 106, and so forth. The client 102 may be configured to generate the request for transmission to a device 602 intermediary to the client 102 and the server 106. In some embodiments, the request may include a synchronize (SYN) packet from the client 102. The SYN packet may be a packet which includes a source port for the server 106, a sequence or identifier from the client 102, and data relating to the connection requested by the client 102. In some embodiments, the client 102 may be configured to send the request to the device 602 (i.e., to an address or port for the device 602). For example, and in some embodiments, the device 602 may be managed by an entity which also manages the server 106 and/or the resource hosted on the server 106. For instance, the device 602 may be a server front-end device. As such, the address of the device 602 may be used for sending requests to establish the connection with the server 106. In other words, the device 602 configured to automatically receive requests which are routed to the server 106 as part of being a server front-end device. As such, when requests to connect to the server 106 are sent by clients 102, such requests may be received (or intercepted) at the device 602. As an example, when a client 102 requests access to an application hosted on the server 106, the client 102 may generate a DNS request or query for a DNS server. The DNS server may respond with an IP address and port of the device(s) 602.

At step 704, a processor 504 of the first cluster may be configured to receive the request for the connection from the client 102 and select a processor of the second cluster. In some embodiments, the processor 504 of the first cluster may be embodied on or otherwise a component of one of the devices 602 of the first cluster. For example, the processor 504 may be a processor of the device 602(1) or device 602(2). The processor 504 may be configured to receive the request at an address of the device 602. The processor 504 may be configured to select a processor 502 of the second cluster to which to forward the request from the client 102. The processor 504 may be configured to select the processor 502 of the second cluster from a plurality of processors 504 of the second cluster.

In some embodiments, the processor 504 may be configured to identify or select the processor 504 of the second cluster according to (i.e., using or based on) one or more load balancing algorithms. For example, the processor 504 may be configured to identify or select the processor 504 of the second cluster according to a round robin load balancing algorithm. The round robin load balancing algorithm may be weighted (i.e., according to a load on the processors 504 of the second cluster). The processor 504 may be configured to access data corresponding to a current load on the processors 504 of the second cluster. In some implementations, the processor 504 may be configured to query the data structure 506 to determine a load on each of the processors 504 of the second cluster. As described in greater detail below, the processor 504 of the first cluster may be configured to populate the data structure 506 with data corresponding to connections maintained by the processors 504 of the second cluster. The processor 504 of the first cluster may determine a current load on each of the processors 504 of the second cluster by querying the data structure 506 to determine a current load on each of the processors 504 of the second cluster. In some embodiments, the processor 504 may determine the current load on each of the processors 504 of the second cluster by querying each of the processors 504 of the second cluster to determine a current load on each of the processors 504. The processor 504 of the first cluster may be configured to identify or select the processor 504 of the second cluster according to a round robin algorithm which is weighted based on a load on the processors 504 of the second cluster. In some embodiments, the processor 504 of the first cluster may be configured to identify or select the processor 504 of the second cluster according to a least loaded load balancing algorithm. For example, the processor 504 may be configured to identify the processor 504 of the second cluster based on which of the processors 504 of the second cluster has fewest loads or connections. The processor 504 of the first cluster may determine the current load on the processors of the cluster 504 based on data from the data structure 506 and/or based on load data received from the processors 504 as described above. The processor 504 of the first cluster may identify or select the processor 504 of the second cluster having the least load (i.e., the fewest connections, processing the fewest packets, etc.).

At step 706, the processor 504 of the first cluster may be configured to forward the request to the selected processor 506 of the second cluster. In some embodiments, the processor 504 may be configured to send, transmit, provide, or otherwise forward the request (i.e., the SYN packet) to the selected processor 504 of the second cluster. The processor 504 of the first cluster may be configured to provide the request to an address of the selected processor 504. The selected processor 504 may be configured to respond to the request with an acknowledgement (i.e., a SYN-ACK packet). The acknowledgement may be or include an acknowledgement of the request and indicating that the selected processor 504 has established a connection (i.e., the primary or first connection) responsive to receiving the request. The selected processor 504 may be configured to provide, generate, or otherwise establish the connection between the client 102 and the server 106 responsive to sending the acknowledgement. For example, once the processor 504 of the first cluster receives the acknowledgement from the selected processor 504 of the second cluster, the processor 504 of the first cluster may be configured to transmit, forward, or otherwise provide the acknowledgement to the client 102. The client 102 may be configured to use the primary or first connection for transmitting, receiving, or otherwise exchanging data between the client 102 and the server 106.

At step 708, the processor 504 of the first cluster may be configured to create, generate, or otherwise establish a persistency session and store a token in the data structure 506. In some embodiments, the processor 504 may be configured to establish the persistency session between the processor 504 and the selected processor 504 of the second cluster. The processor 504 of the first cluster may establish the persistency session responsive to forwarding, sending, transmitting, or otherwise providing the request to the selected processor and receiving the acknowledgement. The acknowledgement may include a key which is used for generating a token or other identifier. The selected processor 504 may be configured to generate the key based on the request. In some embodiments, the selected processor 504 may be configured to generate the key using data specific to the client 102 and the request, including a key of the client 102, a client port or IP address, an IP or port of the server 106 for the request. The selected processor 504 may be configured to generate the key using or based on a security key maintained by the selected processor 504 (such as a recycled key which may be changed at various intervals). In some embodiments, the selected processor 504 may be configured to generate the key using a hash function of a combination of, for example, the client key, the client IP address, the server IP address, and/or the recycled key. The key may be or include a data string which is used by the client 102 and the processor 504 of the first cluster to derive a token which is unique to the session between the client 102 and the server 106. The key may be unique to the selected processor 504. In some embodiments, the key may be unique to the selected processor and the request from the client 102. As described in greater detail below, the client 102, upon receiving the key from the SYN-ACK, may generate the token and include the token in subsequent requests/packets/etc. from the client 102 to the server 106 (i.e., requests for content from the server 102, requests for additional or secondary connections between the client 102 and the server 106, etc.).

The processor 504 of the first cluster may receive the acknowledgement from the selected processor including the key. The processor 504 of the first cluster may be configured to extract the key from the acknowledgement from the selected processor 504. The processor 504 of the first cluster may be configured to generate, derive, or otherwise determine the token or identifier using the key. In some embodiments, the processor 504 may determine the token by computing or determining a cryptographic hash of the key. The cryptographic hash may be dependent on the authentication algorithm selected or negotiated by the client 102 and the server 106, the client 102 and the processor 504 of the first cluster, the client 102 and the processor 504 of the second cluster, and so forth. The processor 504 may be configured to store the token or identifier in the data structure 506 in association with an identifier of the selected processor 504. In some embodiments, the processor 504 may be configured to store the token in a hash table of the data structure 506 in association with an identifier of the selected processor 504. For example, the processor 504 may be configured to compute a hash of the token or identifier and store the computed hash in the hash table of the data structure. The processor 504 may be configured to store the computed hash indefinitely, for a predetermined duration (i.e., until expiration of the key or the token), for a duration of the connection between the client 102 and the server 106 (i.e., until a processor 504 of the first cluster receives a request to terminate the connection), and so forth.

At step 708, the processor 504 of the first cluster may be configured to create a session replica and forward the token to other processors of the first cluster. The processor 504 may be configured to generate, determine, derive, or otherwise create the session replica by generating one or more additional or replica tokens. The replica tokens may be or include a duplicate token which is similar to the token described above and derived from the key received in the acknowledgement from the processor of the first cluster. The processor 504 may be configured to create the session replica to include the replica token(s) and an identifier for the selected processor 504 of the second cluster. The session replica may be used by the processors 504 of the first cluster to determine or identify the selected processor 504 of the second cluster which is associated with the replica token(s). Additionally, the session replica may provide persistence of the multipath connection by ensuring that each of the processors 504 of the first cluster include data corresponding to the primary connection in the event that one of the processors 504 are removed from the first cluster, go offline, crash, restart, etc. At step 710, the processor 504 may be configured to forward, transmit, send, or otherwise provide the replica token to other processors 504 of the first cluster. In some embodiments, the processor 504 may be configured to update the hash table of the data structure 506, which may be accessible by other processors 504 of the first cluster. In this regard, the hash table may be or include a distributed hash table which is accessible by each of the processors 504 of the first cluster.

As one example use case of the method 700 and with reference to FIG. 5 and FIG. 7A, the client 102 may generate a request (i.e., a SYN packet) to establish a primary connection between the client 102 and the server 106. The client 102 may transmit the request to the server 106, which may be received by the processor 504(2) of the first cluster (shown in solid). The processor 504(2) may select the processor 504(3) of the second cluster according to a load balancing algorithm based on a current load of the processors 504 of the second cluster. The processor 504(2) may forward the request from the client 102 to the selected processor 504(3) of the second cluster (shown in solid). The processor 504(3) may establish the connection between the client 102 and the server 106 (shown in solid), and respond to the request with an acknowledgement (i.e., a SYN-ACK packet) which includes a key for deriving or generating a token for the primary connection. The processor 504(3) may send the acknowledgement to the client 102 via the processor 504(2). The processor 504(2) may receive the acknowledgement from the processor 504(3). The processor 504(2) may extract the key and derive the token. The processor 504(2) may store the token for the primary connection in the data structure 506(2). The processor 504(2) may forward the acknowledgement back to the client 102. The client 102 may derive the token using the key received in the acknowledgement. The client 102 may include the token in subsequent requests/data/packets/etc. sent from the client 102 to the server 106 via the processors 504.

Figure 7B:
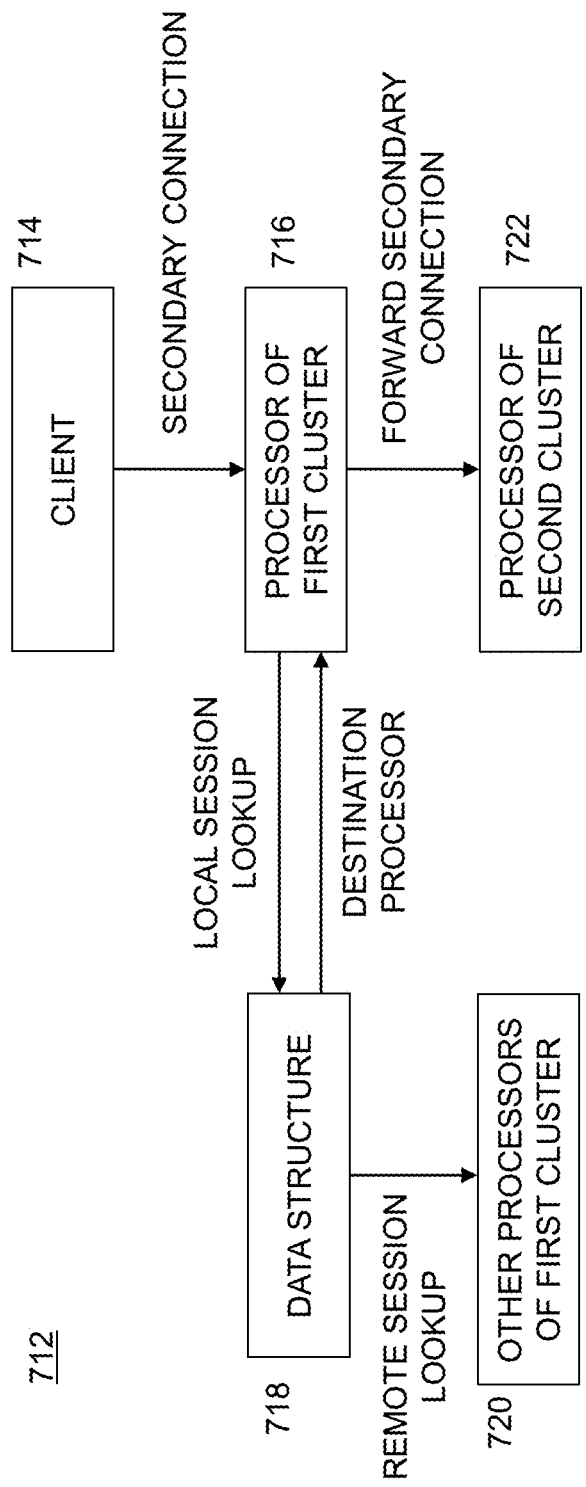
FIG. 7B is a flow diagram showing an example method of establishing a secondary connection, in accordance with an illustrative embodiment.

Referring now to FIG. 7B together with FIG. 5-FIG. 6, depicted is a flow diagram showing an example method 712 of establishing a secondary connection, according to an illustrative embodiment. As a brief overview, at step 714, the client 102 may be configured to generate a request for a secondary connection. At step 716, a processor 504 of the first cluster may be configured to receive the request for the secondary connection from the client 102. At step 718, the processor 504 of the first cluster may be configured to perform a local session lookup in the local data structure 506 of the processor 504. If the processor 504 of the first cluster does not identify a destination processor 504 of the second cluster from the lookup in the local data structure 506, at step 720, the processor 504 of the first cluster may perform a remote session lookup in data structures 506 of other processors 504 of the first cluster to identify a destination processor 504. On the other hand, if the processor 504 of the first cluster identifies a destination processor 504 in the local data structure, the processor 504 of the first cluster forwards the request from the client 102 to the destination processor 504 of the second cluster.

At step 714, the client 102 may be configured to generate a request for a secondary connection. Step 714 may be similar in some aspects to step 702 described above. In this example, the request for the secondary connection may include a token. The client 102 may derive the token using the key received from the processor 504 of the second cluster as described above. The client 102 may be configured to include, incorporate, or otherwise provide the token with the request for the secondary connection. The client 102 may be configured to transmit, send, or otherwise provide the request including the token to a processor 504 of the first cluster.

At step 716, a processor 504 of the first cluster may be configured to receive the request for the secondary connection from the client 102. In some instances, the client 102 may be configured to provide the request to the processor 504 of the first cluster which received the first request (i.e., the request to establish the primary connection). In some instances, the client 102 may be configured to provide the request to a different processor 504. In other words, the processor 504 which receives the request for the secondary connection from the client 102 at step 716 may or may not be the same processor 504 which receives the request for the primary connection from the client 102 at step 704 of FIG. 7A. The processor 504 which receives the request for the secondary connection may parse the request to extract the token included in the request.

At step 718, the processor 504 of the first cluster may be configured to perform a local session lookup in the local data structure 506 of the processor 504. In some embodiments, the processor 504 may perform the local session lookup in the local data structure 506 using the token from the request. If the processor 504 of the first cluster does not identify a destination processor 504 of the second cluster from the lookup in the local data structure 506, at step 720, the processor 504 of the first cluster may perform a remote session lookup in data structures 506 of other processors 504 of the first cluster to identify a destination processor 504. In these or other embodiments, the processor 504 may configured determine whether the token corresponds to an existing primary connection between the client 102 and the server 106 based on the token matching a token in one of the data structures 706 stored by one of the processors 504 of the first cluster.

The processor 504 may be configured to perform a lookup function using the token from the request in the local or remote data structures 506 to determine whether the token matches a token in the local or remote data structures 506. The processor 504 may be configured to determine or identify a destination processor 504 of the second cluster responsive to the token matching a token in the local or remote data structure 506. As described above, the tokens may be stored in the local and/or remote data structure 506 in association with an identifier of a processor 504 of the second cluster. The processor 504 may extract the identifier of the destination processor 504 from the local and/or remote data structure which is associated with the matching token.

If the processor 504 of the first cluster identifies a destination processor 504 in the local or remote data structure from the local or remote session lookup, at step 722, the processor 504 of the first cluster forwards the request from the client 102 to the destination processor 504 of the second cluster. The destination processor 504 of the second cluster may receive the request from the processor 504 of the first cluster. The destination processor 504 may be configured to establish the secondary connection and respond to the client 102 with an acknowledgement including a key for the secondary connection. The destination processor 504 may transmit, send, or otherwise provide the acknowledgement of the secondary request to the client via the processor 504 of the first cluster. The processor 504 of the first cluster may generate a second token based on the key for the secondary connection, and store the token in the data structure as described above. The method 712 shown in FIG. 7B may be performed any number of times to establish any number of secondary connections between the client 102 and the server 106.

Continuing the use case of the method 700 and in reference to FIG. 5 and FIG. 7B, the client 102 may generate a request (i.e., a SYN packet) to establish a secondary connection between the client 102 and the server 106. The client 102 may transmit the request to the server 106 including a token derived by the client 102 based on the key received in the acknowledgement of the primary connection. A processor 504(1) of the first cluster may receive the request to establish the secondary connection (shown in dot-dash). The processor 504(1) may extract the token from the request received from the client 102. The processor 504(1) may perform a lookup in the local data structure 506(1) using the token from the request to identify a destination processor. In this example, since the processor 504(1) did not receive the first request (i.e., the request to establish the primary connection), the processor 504(1) may not identify a matching token in the data structure 506(1). The processor 504(1) may then perform a remote session lookup in the data structure 506(2) of other processors 504(2) of the first cluster using the token. In this example, since the processor 504(2) received the first request, the data structure 506(2) may include a token which matches the token received in the request for the secondary connection. The processor 504(1) may retrieve, from the data structure 506(2), the identifier which was stored in association with the matching token. The processor 504(1) may identify the destination processor 504(3) using the identifier from the data structure 506(2).

The processor 504(1) may forward the request from the client 102 to the destination processor 504(3) (shown in dot-dash). The processor 504(3) may receive the request from the processor 504(1), and establish the connection (shown in dot-dash) between the client 102 and the server 106. The processor 504(3) may respond to the request with an acknowledgement (i.e., a SYN-ACK packet) which includes a key for deriving or generating a token for the secondary connection. The processor 504(3) may send the acknowledgement to the client 102 via the processor 504(1). The processor 504(1) may receive the acknowledgement from the processor 504(3). The processor 504(1) may extract the key and derive the token. The processor 504(1) may store the token for the secondary connection in the data structure 506(1). The processor 504(1) may forward the acknowledgement back to the client 102. The client 102 may derive the token using the key received in the acknowledgement.

Figure 8A:
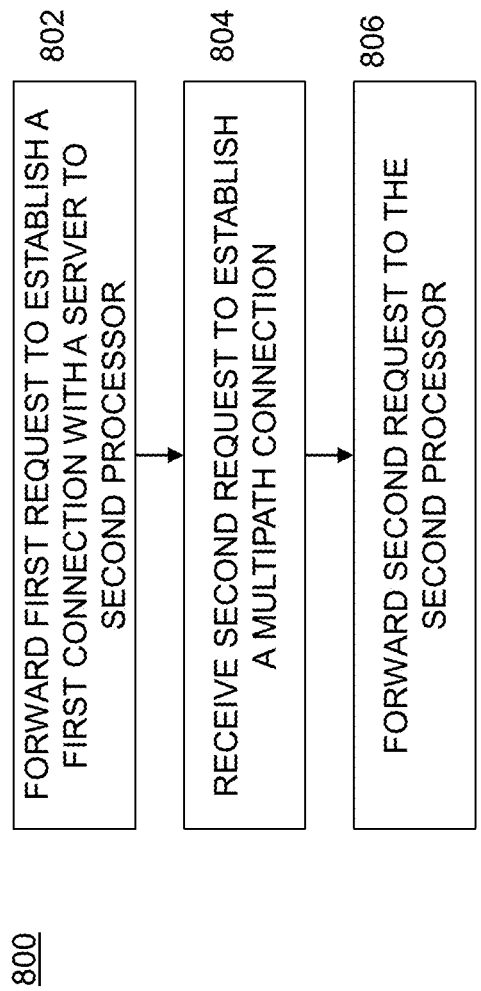
FIG. 8A is a flow diagram showing a method for establishing a multipath connection, in accordance with an illustrative embodiment.

Referring to FIG. 8A, depicted is a flow diagram showing a method 800 for establishing a multipath connection, according to an illustrative embodiment. The method 800 may be implemented or performed by one or more of the processors of the first cluster described above with reference to FIG. 5-FIG. 6. As a brief overview, at step 802, a processor forward a first request to establish a first connection with a server to a second processor. At step 804, a processor receives a second request to establish a multipath connection. At step 808, the processor forwards the second request to the second processor.

At step 802, a processor forward a first request to establish a first connection (or subflow) with a server to a second processor. In some embodiments, a first processor of a first cluster may forward a first request from the client to establish a first connection with the server to a second processor of the second cluster. The first connection may be a primary connection or subflow of a multipath connection. In some embodiments, the processor of the first cluster may receive a first request from a client. The processor of the first cluster may receive the first request responsive to the client launching an application hosted on the server. The processor of the first cluster may receive the first request responsive to the client accessing a domain or resource hosted on the server. The client may send the first request to an address of the server. The processor may receive the request. The processor may be arranged intermediary to the client and the server. The processor(s) of the first cluster may share the address with the server such that requests for the server are routed to the processor(s) of the first cluster. The first processor may intercept or receive the first request.

The first processor may select the second processor of the second cluster from a plurality of processors of the second cluster. In some embodiments, the first processor may receive load data for each of the processors of the second cluster. In some embodiments, the first processor may receive the load data from the processors of the second cluster. In some embodiments, the first processor may retrieve or otherwise access the load data from a data structure maintained or otherwise accessible by the first processor. The first processor may select the second processor from the plurality of second cluster based on the load of the second processor. In some embodiments, the first processor may select the second processor based on a load balancing algorithm maintained or otherwise used by the first processor. The load balancing algorithm may be or include a weighted or straight round robin, a least loaded processor algorithm, and so forth. The first processor may forward the request from the client to the second processor responsive to selecting the second processor.

In some embodiments, the first processor may receive a response to the first request from the second processor. The first processor may receive a response from the second processor responsive to the second processor establishing the primary connection. In some embodiments, the response may be an acknowledgement of establishing the primary connection. The response may include a key for deriving a token. The token may be unique to the connection between the client and the server. The second processor may generate the response and including the key responsive to establishing the primary connection. The second processor may transmit the response including the key to the client via the first processor. The first processor may receive the response. The first processor may extract or otherwise identify the key from the response from the second processor. The first processor may generate a token based on the key from the response to the request. The first processor may store the token in a data structure maintained by the first processor and accessible by the processors of the first cluster. For example, the data structure may include a table including a plurality of tokens for a plurality of clients between clients and processors of the second cluster. The first processor may add an entry to the table to include the token. In some embodiments, the first processor may store the token in association with an identifier of the second processor. In some embodiments, the first processor may add an entry to tables maintained by other processors of the first cluster. For example, the first processor may transmit the token to other processor(s) of the first cluster for storage in a table maintained by the other processors of the first cluster.

At step 804, a processor receives a second request to establish a multipath connection. In some embodiments, a third processor of the first cluster of processors may receive a second request to establish a multipath connection between the client and the server. In other words, the processor which receives the second request at step 804 may be different from the processor which receives the first request at step 802. In some embodiments, the third processor may receive the second request responsive to the client requesting a multipath connection to the server. In some embodiments, the third processor may determine that the second request is to establish a multipath connection responsive to the second request including the token. For example, the client may generate the token using the key received in the acknowledgement from the second processor. The third processor may determine that the second request is to establish a multipath connection based on the second request including the token (i.e., indicating that the client currently has a primary connection or subflow which has already been established).

In some embodiments, the third processor may identify the second processor to which the third processor is to forward the second request. The third processor may identify the second processor using the token received in the second request. For example, the third processor may parse the second request to extract the token received from the client. The third processor may query the data structure of the third processor (and/or the data structure of other processor(s) of the first cluster) to determine whether the token received from the request matches any tokens from the data structure(s). In some embodiments, the data structure maintained by the first and/or third processor(s) may include a table (such as a distributed hash table). The third processor may query the table using the token received in the request to determine whether the token matches any tokens included in the table. Where the data structure includes a token which matches the token received from the client in the second request, the third processor may identify the corresponding processor (i.e., the second processor) to which to forward the second request. As described above, the tokens may be stored in the data structure in association with an identifier of a processor of the second cluster. When the third processor identifies the matching token from the data structure, the third processor may extract or otherwise identify the identifier of the processor which is associated with the matching token in the data structure.

At step 808, the processor forwards the second request to the second processor. In some embodiments, the third processor forwards the second request to the second processor to establish the multipath connection that includes the first connection and a second connection used as paths of the multipath connection. In some embodiments, the third processor forwards the second request to the second processor responsive to determining that the second request is to establish a multipath connection. In some embodiments, the third processor may determine that the second request is to establish a multipath connection based on the second request including the token. In some embodiments, the third processor may determine that the second request is to establish a multipath connection based on the token included in the second request matching a token included in the data structure of the first and/or the third processor. The third processor may forward the second request to an address of the second processor. In some embodiments, the address of the second processor may be or include the identifier stored in the data structure. In some embodiments, the third processor may identify the address of the second processor using the identifier (i.e., by performing a lookup or query in an address table using the identifier received or retrieved from the data structure). As described in greater detail below with reference to FIG. 8B, the second processor may receive the first and second requests (i.e., from the first and third processors) and establish the multipath connection between the client and the server.

Figure 8B:
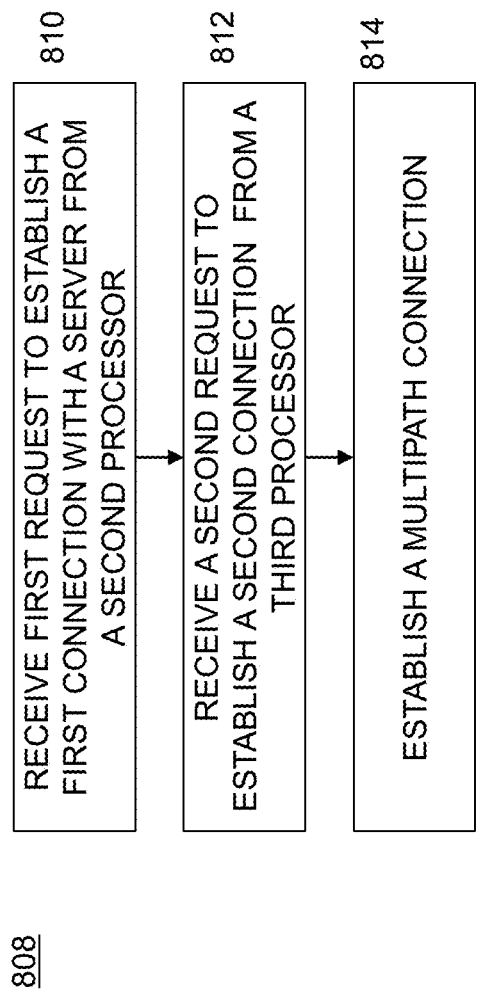
FIG. 8B is a flow diagram showing a method for establishing a multipath connection, in accordance with an illustrative embodiment.

Referring now to FIG. 8B, depicted is a flow diagram showing a method 808 for establishing a multipath connection, according to an illustrative embodiment. The method 808 may be implemented or performed by one or more of the processors of the second cluster described above with reference to FIG. 5-FIG. 6. As a brief overview, at step 810, a first processor receives a request to establish a first connection with a server from a second processor. At step 812, the first processor receives a request to establish a second connection from a third processor. At step 814, the first processor establishes a multipath connection.

At step 810, a first processor receives a request to establish a first connection with a server from a second processor. In some embodiments, the first processor may receive a first request to establish a first connection between the client and a server from a second processor of the cluster of processors that is intermediary to the first processor and a client. As such, the first processor may be intermediary to a server and the cluster of processors which includes the second processor. In this embodiment, the first processor may be a processor of the second cluster of processors, and the second processor may be a processor of the first cluster of processors. For example, the first processor described herein with reference to FIG. 8B is referred to as the second processor above in FIG. 8A. On the other hand, the second (and third) processor described herein with reference to FIG. 8B is referred to as the first and third processor above in reference to FIG. 8A.

In some embodiments, the first processor may receive the first request responsive to the second processor selecting the first processor from a plurality of processors of the second cluster. The second processor may select the first processor according to a load of the first processor relative to a load of other processors of the second cluster. The first processor may receive the first request originating from the client. The first request may include a SYN packet. The first processor may establish the first connection (i.e., primary connection or subflow) responsive to receiving the SYN packet included in the first request. The first processor may generate response or acknowledgement of the first request (i.e., a SYN-ACK packet). The first processor may generate the response responsive to receiving the first request. The first processor may generate the response responsive to establishing the first connection. The first processor may generate a key for including in the response. The first processor may generate the key based on the first request. For example, the processor may use data from the SYN packet to generate the key. In some embodiments, the first processor may generate the key using data specific to the client and the request, including a key of the client, a client port or IP address, an IP or port of the server for the request. The first processor may generate the key using or based on a security key maintained by the selected processor (such as a recycled key which may be changed at various intervals). In some embodiments, the selected processor may generate the key using a hash function of a combination of, for example, the client key, the client IP address, the server IP address, and/or the recycled key. The first processor may incorporate the generated key into the response which is sent to the second processor and forwarded to the client. As described above, both the client and the second processor may derive, determine, or otherwise generate a token based on or using the key. The client may generate the token based on the key and include the token in subsequent requests/packets/data/etc. sent from the client to the server (i.e., via the processor(s) of the first and second cluster). The second processor may generate the token for storage in a data structure of the second processor. In some embodiments, the second processor may share the token with other processors of the first cluster. For example, the second processor may store the token in a table of a data structure which is accessible by other processors of the first cluster. As another example, the second processor may transmit the token to other processors of the first cluster for storage in a table of a data structure maintained by the other processors.

At step 812, the first processor receives a request to establish a second connection from a third processor. In some embodiments, the first processor may receive a second request to establish a second connection between the client and the server from a third processor of the cluster of processors (i.e., the first cluster of processors including the second processor which sent the first request to the first processor). The first processor may receive the second request responsive to the third processor identifying the first processor. The third processor may identify the first processor using a token received in the second request. For example, and as described above, the client may generate the token using the key received in the response from the first processor. The client may include the token in the second request. The third processor may receive the second request from the client, and perform a lookup in the data structure to identify the first processor as described above with reference to FIG. 8A. The third processor may transmit the second request to the first processor including the token.

The first processor may receive the second request including the token. The first processor may determine that the second request is to establish a multipath connection based on the second request including the token. The first processor may determine that the second request is to establish a multipath connection based on the token corresponding to (i.e., being generated from) the key previously generated by the first processor. The first processor may determine or identify the primary connection maintained by the first processor using the token. For example, the key may include data relating to (i.e., identifying) the primary connection. Since the token is generated by the client using the key, the token may correspondingly include the data (or may be used to derive the data) which identifies the primary connection.

At step 814, the first processor establishes a multipath connection. In some embodiments, the first processor may establish a multipath connection between the client and the server. The multipath connection may include the first connection (i.e., the primary connection or subflow) and the secondary connection (or subflow). The first and second connections may be used as paths of the multipath connection. In some embodiments, certain traffic may be routed between the client and the server via the first and second connection. For example, secure traffic may be routed via the primary connection (which may be a more secure connection) and other traffic may be routed via the secondary connection. As another example, the primary and secondary connections may be used to provide redundancy and persistence of the multipath connection. For instance, the secondary connection may be used as a fallback connection in the event of a disruption, interruption, or disconnection of the primary connection.

Various elements, which are described herein in the context of one or more embodiments, may be provided separately or in any suitable sub-combination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

I claim:

1. A method comprising:
  forwarding, by a first processor of a first cluster of processors that is intermediary to a client and a second cluster of processors and the second cluster of processors is intermediary to the first cluster of processors and a server, to a second processor of the second cluster, a first request from the client to establish a first connection with the server;
  receiving, by a third processor of the first cluster of processors, from the client, a second request to establish a multipath connection between the client and the server; and
  forwarding, by the third processor, responsive to determining that the second request is to establish a multipath connection, the second request to the second processor to establish the multipath connection that includes the first connection and a second connection used as paths of the multipath connection;
  receiving, by the first processor from the second processor, a response to the first request including a key;
  generating, by the first processor, a token based on the key from the response to the first request; and storing, by the first processor, the token in a data structure maintained by the first processor accessible by the first cluster of processors.

2. The method of claim 1, wherein the third processor determines that the second request is to establish the multipath connection responsive to the second request including the token.

3. The method of claim 1, wherein the token is a first token, the second request includes a second token, and wherein the method further comprises:
identifying, by the third processor, the second processor to which the third processor is to forward the second request based on the second token matching the first token from the data structure.

4. The method of claim 1, wherein the data structure comprises a table including a plurality of tokens for a plurality of connections between clients and processors of the second cluster.

5. The method of claim 4, wherein the token is a first token, wherein the client generates a second token which matches the first token using the key received from the response, wherein the second request includes the second token, and wherein the method further comprises:
querying, by the third processor, the table maintained by the first processor using the second token to identify the second processor.

6. The method of claim 1, wherein the data structure comprises a first data structure, and wherein the method further comprises:
transmitting, by the first processor to the third processor of the first cluster, the token for storage in a second data structure maintained by the third processor.

7. The method of claim 1, further comprising:
receiving, by the first processor, the first request from the client; and
selecting, by the first processor, the second processor from the cluster of second processors to which to forward the first request based on a load of the second processor.

8. A method comprising:
receiving, by a first processor intermediary to a server and a cluster of processors, from a second processor of the cluster of processors that is intermediary to the first processor and a client, a first request to establish a first connection between the client and a server;
receiving, by the first processor, from a third processor of the cluster of processors, a second request to establish a second connection between the client and the server; and
establishing, by the first processor, between the client and the server, a multipath connection that includes the first connection and the second connection used as paths of the multipath connection;
receiving, by the second processor from the first processor, a response to the first request including a key;
generating, by the second processor, a token based on the key from the response to the first request; and
storing, by the second processor, the token in a data structure maintained by the first processor accessible by the first cluster of processors;
storing, by the second processor, the token in a data structure maintained by the second processor accessible by the cluster of processors.

9. The method of claim 8, wherein the second request includes a token generated by the client based on a key included in a response to the first request, wherein the first processor establishes the multipath connection responsive to the token included in the second request.

10. The method of claim 8, wherein the third processor identifies a token from the second request received from the client, the token generated using a key provided by the first processor to the second processor responsive to the first request, the third processor forwarding the second request to the first processor responsive to determining.

11. A device comprising:
a first processor of a first cluster of processors that is intermediary to a client and a second cluster of processors and the second cluster of processors is intermediary to the first cluster of processors and a server, the first processor configured to:
transmit, to a second processor of the second cluster, a first request from the client to establish a first connection with the server;
receive, from the client, a second request to establish a multipath connection between the client and the server; and
forward, responsive to determining that the second request is to establish a multipath connection, the second request to the second processor to establish the multipath connection that includes the first connection and a second connection used as paths of the multipath connection;
receive, from the second processor, a response to the first request including a key;
generate a token based on the key from the response to the first request; and
store the token in a data structure maintained by the first processor accessible by the first cluster of processors.

12. The device of claim 11, wherein the first processor determines that the second request is to establish the multipath connection responsive to the second request including the token.

13. The device of claim 11, wherein the token is a first token, the second request includes a second token, and wherein the first processor is further configured to:
identify the second processor to which the first processor is to forward the second request based on the second token matching the first token from the data structure.

14. The device of claim 11, wherein the data structure comprises a table including a plurality of tokens for a plurality of connections between clients and processors of the second cluster.

15. The device of claim 14, wherein the token is a first token, wherein the client generates a second token which matches the first token using the key received from the response, wherein the second request includes the second token, and wherein the first processor is further configured to:
query the table maintained by the first processor using the second token to identify the second processor.

16. The device of claim 11, wherein the data structure comprises a first data structure, and wherein the first processor is further configured to:
transmit, to the third processor of the first cluster, the token for storage in a second data structure maintained by the third processor.

17. The device of claim 11, wherein the first processor is further configured to:
receive the first request from the client; and
select the second processor from the cluster of second processors to which to forward the first request based on a load of the second processor.

* * * * *